March 9, 1965 W. BUNGARDT 3,172,797
METHOD OF PRODUCING BEARING AND LIKE STRUCTURES FOR
SHAFTS, SPINDLES AND SIMILAR ELEMENTS
Filed July 30, 1959
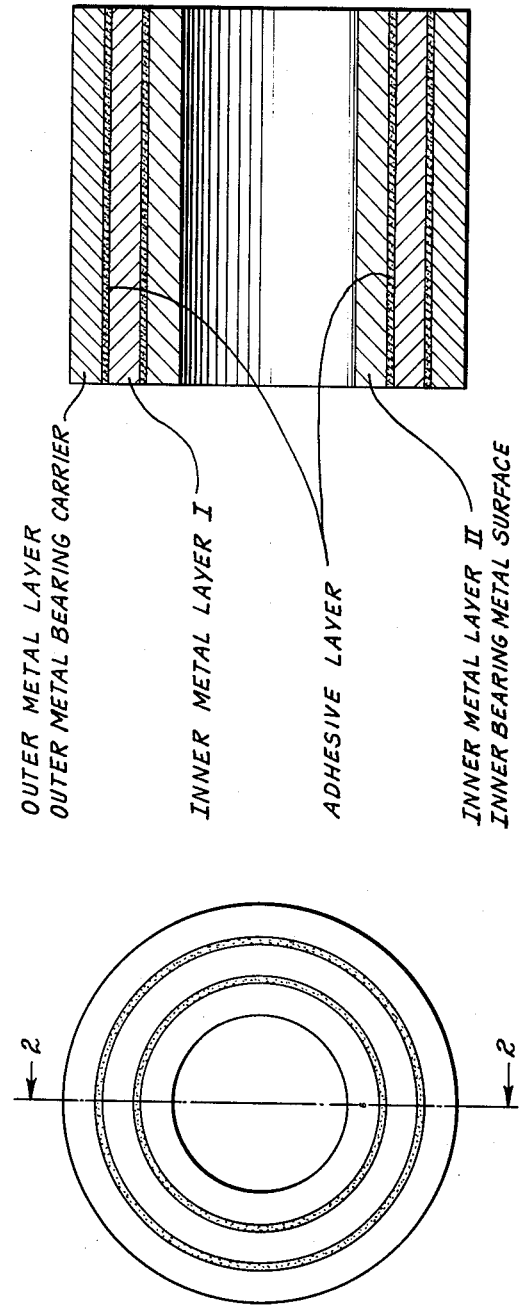
INVENTOR
WALTER BUNGARDT
BY
McGlew & Toren
ATTORNEY

300

United States Patent Office 3,172,797
Patented Mar. 9, 1965

3,172,797
METHOD OF PRODUCING BEARING AND LIKE STRUCTURES FOR SHAFTS, SPINDLES AND SIMILAR ELEMENTS
Walter Bungardt, Essen, Germany, assignor to Th. Goldschmidt A.-G., Essen, Germany
Filed July 30, 1959, Ser. No. 830,567
Claims priority, application Germany, Aug. 1, 1958, G 25,018
1 Claim. (Cl. 156—283)

The present invention relates to new bearing structures and more specifically to a new method of highly economically producing bearing and like structures for shafts, spindles and similar elements, whereby at least two parts of different metals are employed, one forming the bearing housing or support and the other constituting the liner therefore or inner bearing surface for slidable engagement with a movable or rotatable shaft and similar element.

It is one of the primary objects of the present invitation to provide means facilitating and speeding highly efficacious manufacture of bearing structures of the aforesaid type, in which the metal of the bearing support or carrier is intimately interconnected with the liner metal for the bearing, or the latter is permanently anchored to the said carrier by means of an adhesive bond of a synthetic plastic composition, which is strong, durable and affords other highly desirable characteristics in the art of connecting composite metal parts or surfaces together.

It is another object of this invention to provide means conductive to a novel method of bonding two or more metal surfaces together by means of a relatively thin and adhesive, plastic stratum or layer, which is capable of setting and thereby interconnecting said surfaces in predetermined relationship to each other.

A further important object of this invention resides in the provision of means rendering the possibility of manufacturing at first the metal bearing support, as well as the metal bearing layer proper as two separate and precise units of different metals and, after a short pretreatment, of assembling and connecting said units together within a minimum of time and, if desired, by unskilled labor, whereby said metal bearing liner or layer, which slidably engages a shaft surface, is easily and readily replaceable after wear and is otherwise during operation, cushioned to a predetermined extent by the intermediate bonding stratum of hardenable synthetic plastic adhesive material against the bearing support.

Other objects and advantages will ensure from the following disclosure and the attached drawing which illustrates in FIG. 1 a cross-sectional view of a bearing structure embodying the invention and composed of a bearing support or carrier and a bearing liner made from different metals.

FIG. 2 is a section of FIG. 1 along lines 2—2.

The method according to this invention consists more specifically of adhesively and not mechanically bonding together metal surfaces composed of different metal layers in the manufacture of babbitt bearings in which two or more metals or metal alloys are to be securely bonded with each other.

Babbitt bearings made from several metals or metal alloys which are securely and mechanically fastened to each other and which have different physical properties are well known in the art. Such bearings owe their existence to the demand for bearing metals which offer, on the one hand, satisfactory sliding properties and compromise, on the other hand, supporting sleeves or collars of sufficient mechanical strength for sliding bearing metals, which are securely mechanically connected with each other to form a single bearing unit.

A great number of metal combinations has hitherto been used to form such babbitt bearings, among them, for example, steel-lead-bronze, babbitt sleeve bearings, steel sleeves with linings, steel strip with rolled on light metal alloys, steel sleeves with a silver layer deposited on the steel by means of a galvanic process and many other combinations.

Likewise well known in the art are the so-called multi-layer babbitt bearings which comprise a sleeve made from steel supporting two different bearing materials, bronze and babbitt metal, for instance, which have different mechanical properties.

Many technical possibilities are known for the manufacture of such babbitt bearings. According to conventional methods, a bearing metal is placed into the prepared bearing box by means of any appropriate melting or pouring process, casting on end or centrifugal casting being applied for this purpose. Melting the bearing material can either be done in separate furnaces or in the supporting steel bearing box or steel sleeve itself by means of inductive heating.

The experience acquired during recent years has shown that the manufacture of babbitt bearings, particularly if bearing bodies of larger size are concerned, involves considerable technical difficulties. In order to make sure that an intimate and sufficiently secure connection is obtained between the bearing metal, babbitt metal, for instance, and the supporting bearing bushing, which in most cases is made from steel or bronze, it was necessary that the bearing body must be heated up to high temperatures before the bearing metal alloy is poured into it. A certain delay is frequently unavoidable with such operation. The difference of the coefficients of expansion of the bearing metal and the material of the supporting bushing or sleeve give frequently rise to stresses which, at least locally, will cause a deficiency of the bonding effect.

There are also other metal combinations, grey cast-iron-Babbitt metal, for instance, with which the manufacture of the bearing lining is only successful after rather complicated technical preparatory work has been done on the supporting body made from grey cast-iron. With this combination, in many cases a mechanical clamping operation by means of recesses or similar structural means is the only possibility to obtain a sufficient bond. Such solutions, however, are not always applicable as these might interfere with rational and economical manufacturing methods.

Compound casting techniques hitherto employed have also the disadvantage that they are not applicable to many metal combinations which are quite desirable. It is impossible, for instance, to pour a lead-bronze lining into a bearing block made from high-strength cast aluminium or malleable alloy, although such a combination would be useful for many technical purposes. Also, as experience has shown, a lining which is securely bonded to the supporting bushing can only be used with difficulties in aluminium or manganese housings when commercial Babbitt metals are used.

It has now been found that difficulties of the aforesaid nature can be eliminated in a rather technically simple and economically advantageous manner if the component parts of the babbitt bearing are manufactured separately and, after an appropriate preparation of their surfaces to be joined, are connected with each other by means of a cementing operation so as to form a compound structural unit.

Cementing or bonding of individual metals in babbitt bearing constructions constitutes a great technical advantage, because it is now possible to use metal combinations for this purpose which were held to be unusual up to now, and which, as has already been mentioned, could not be realized by hitherto common manufacturing techniques. Moreover, the application of cementing according to the present invention offers the advantage of greatly increased economy when compared with methods of manufacturing babbitt bearings practiced up to date.

Experiments carried out on cemented or bonded babbitt bearings pursuant to the invention have shown that commercially known metal adhesives can be readily used to obtain the bond between the supporting bearing bushing and the bearing lining. It is immaterial in such case, whether cold or hot setting adhesives are used. In accordance with the chemical composition of the respective adhesive employed, setting may be effectuated either without any pressure or with a relative light pressure, on the one hand, or through application of greater or extensive pressures, on the other hand. It is possible, e.g., to effect cold or hot setting without any application of pressure, if epoxy resins (known under "Araldit I natural" manufactured by Ciba, Basel) belonging to the polyaddition compounds or the acryl-nitrile or acrylester-polymers or mixed polymers belonging to the group of polymerization resins, are used. "Araldit I natural" is a mixture in powder form, solid at room temperature, of a polyglycidyl ether of bisphenol A made by reacting bisphenol A with epichlorohydrin and containing dicyandiamide as a heat curing agent. However, if polycondensation resins are used, in particular phenolic resins with and without thermosetting additions are of special interest, because of their high adhesive power on metals, in which case preferably hot setting is effected at pressures ranging between 2 and 20 kg./cm.$^2$. Sufficiently securely bonded and mechanically resistant babbitt bearings can be manufactured according to the present invention, if any of these aforementioned adhesives are used.

For certain purposes it is possible advantageously to make use of the above mentioned types of adhesives in the form of adhesive foils with and without filler substance or material as they are already available on the market. While the adhesive materials without filler substance are generally limited to thermosetting synthetic plastic compositions, it is possible with the two other types or combinations to apply synthetic resin composition or the mixtures on any desired carrier. The following materials are known as such carriers or fillers: paper, textile fabrics, fleeces made from natural, artificial or glass fiber, as well as thin wire cloth, such as nettings or gauzes or perforated thin metal foils.

It has further been found when carrying out the aforesaid process or technique that it is of advantage if, particularly with bearings subjected to higher mechanical and thermal stresses, graphite powder is added to the adhesive in order to increase and improve the thermal conductivity. It has also been found that increased heat dissipation may be obtained with normally reduced heat conducting adhesives, if metallic fillers are used which may have the form of any suitably shaped copper wire netting. Finely ground metal powders consisting of metals having good heat conductive properties, may also be advantageously used.

The following examples are given in order to more clearly set out the method according to the present invention.

*Examples*

(I) *Steel-Babbitt metal.*—It is first of all necessary that any surface unevenness is removed on the supporting steel bearing part and that the latter is given an appropriate preparatory treatment. It is cleaned by means of a suitable alkaline solution containing commercial wetting agents at a temperature of 70° to 90° C. Subsequently, the part is pickled for a period of 15 minutes in a bath at about 50° C. and consisting of 35 parts by weight of a saturated $Na_2CR_2O_7$ solution in 1000 parts by weight of $H_2SO_4$ (d.=1.84). The part is then rinsed in hot water and allowed to dry in the atmosphere. The Babbitt metal is treated by means of emery, wire brush or steel wool until a uniform and clean surface is obtained; subsequently it is washed in carbon tetrachloride. The cementing or bonding step is carried out as follows: A commercially available, self-setting epoxy resinous substance in powder form is applied to the metal surfaces prepared as described above, and heated up to 130° to 150° C. The pulverized resin material will readily liquify under the influence of heat and distributes uniformly over the surfaces, the quantity of adhesive or bonding substance applied to both adjacent surfaces should be approx. 70 to 80 grams per square meter, so that the cemented joint mass assumes a resin content of 140 to 160 gr./m.$^2$. The thickness of the cemented joint mass is approx. 0.1 mm. The parts to be bonded, as long as the binding agent (epoxy resin) is still liquid, are brought in contact with each other with a lightly applied pressure, while setting is being effected optionally in accordance with the following table:

| Setting time | Temperature, ° C. |
|---|---|
| 10 hours | 130 |
| 5 hours | 140 |
| 3 hours | 150 |
| 2 hours | 160 |
| 80 minutes | 170 |
| 55 minutes | 180 |
| 45 minutes | 190 |
| 30 minutes | 200 |

(II) *Steel-lead-bronze.*—The supporting steel bushing or body is given a preparatory treatment as indicated in connection with Example I. The lead-bronze is degreased by using carbon tetrachloride and is subsequently ground by means of fine emery or by means of light sand blasting. For the purpose of bonding, a polymerisation synthetic resin (e.g. a polymer of methacrylester—known under the trade name "Agomet-E" manufactured by Atlas-Ago at Wolfgang-Hanau (Germany)) immediately before the application with the prescribed quantity of hardening agent is applied to the prepared metal surfaces and is then allowed under pressure to set for a couple of hours at room temperature.

(III) *Steel-aluminium.*—A supporting bushing made from steel is given a preparatory treatment as described in detail in connection with example I. Aluminium is first of all degreased by means of carbon tetrachloride or trichloracetylene and subsequently pickled. The parts are given a preliminary treatment for a period of 20 minutes in a mixture composed of 24 parts by weight of sulphuric acid (d.=1.82), 7.5 parts by weight of sodium bichromate and 77 parts by weight of water having a temperature of about 70° C. Subsequently, the parts thus treated are carefully rinsed in water. Cementing or bonding should be carried out as soon as possible after this preliminary treatment. Cementing is done by the use of a combination of a hot setting phenolic resin of the resole type (known as "Redux" manufactured by Aero Research Ltd. of Duxford-Cambridge) with coarsely ground powder of polyvinylformal in such manner that both surfaces of the metal parts are brushed with liquid phenolic resin upon which is then strewed and applied the powdered polyvinylformal. The quantity of phenolic resin applied is approx. 100 gr./m.$^2$ for metal surface and the quantity of polyvinyly-formal to be applied amounts to approx. 60 gr./m.$^2$. The adhesive or cement mass is allowed to set for a period of 12 minutes at a temperature of 150° C., the applied pressure amounting to about 10 kg./cm.² It is further proposed that 3 to 50% of powdered graphite and a predetermined quantity of a known hardening agent be admixed by kneading to the pasty epoxy resinous mass which is free of solvents. The application of this cement or adhesive mass on the metal surfaces to be bonded should be done as quickly as possible. Setting of the adhesive may be effected at room temperature or at lightly higher temperature without the application of pressure. Such an adhesive mass is suitable for all metal combinations.

Various changes and modifications may be made without departing from the spirit and scope of the present invention and it is intended that such obvious changes and modifications be embraced by the annexed claim.

Having thus described the invention, what is claimed as new and desired to be secured by Letters Patent is:

A method of manufacturing a babbitt bearing, which comprises manufacturing a supporting bearing component of steel, pickling said steel component, manufacturing a Babbitt metal bearing component for lining said steel component, cleaning said Babbitt metal bearing component, applying an epoxy resin in solid form to at least one of said metal components and heating said metal component to above the melting point of the epoxy resin to a temperature of between about 130–150° C., whereby said epoxy resin melts to form a thin layer of fluid adhesive, pressing the two components against each other with the adhesive layer interposed and curing said epoxy resin for about 10 minutes to 10 hours at a temperature of about between 130–200° C.

References Cited by the Examiner
UNITED STATES PATENTS

| | | | |
|---|---|---|---|
| 1,937,840 | 12/33 | Pike et al. | 308—237 XR |
| 2,181,136 | 11/39 | Knox | 29—149.5 |
| 2,280,981 | 4/42 | Schuh | 154—129 |
| 2,499,134 | 2/50 | De Bruyne | 154—43 |
| 2,554,008 | 5/51 | Burger | 29—149.5 |
| 2,568,463 | 9/51 | Reynolds | 154—129 XR |
| 2,682,515 | 6/54 | Naps. | |
| 2,726,978 | 12/55 | Skinner | 151—81 |
| 2,910,094 | 10/59 | Barnes et al. | 154—83 XR |
| 2,931,684 | 4/60 | Johnson | 29—149.5 XR |
| 2,974,080 | 3/61 | Trible | 154—43 |

OTHER REFERENCES

"Epoxy Resins," by Lee and Neville, 1957 pp. 146–153 and 225–31 referred to.

"Epoxy Resins," Lee and Neville, of record, additional pages 213–224.

"Selecting the Right Journal Bearing Material," Scott et al., Product Engineering, September 1952, pp. 119–126.

"Improved Aluminum-Tin Bearing Alloys," Cuthbertson et al., Tin Research Institute, Fraser Road, Greenford, Middlesex, England, pp. 3–10; reprint from Metal Industry, vol. 85, No. 5, July 30, 1954.

EARL M. BERGERT, *Primary Examiner.*

ALEXANDER WYMAN, CARL F. KRAFFT,
*Examiners.*